(12) United States Patent
Gonzalez Aguirre et al.

(10) Patent No.: US 10,846,943 B2
(45) Date of Patent: Nov. 24, 2020

(54) OPTIMIZING VIEWING ASSETS

(71) Applicant: Microsoft Technology Licensing, LLC, Redmond, WA (US)

(72) Inventors: Ana Sofia Gonzalez Aguirre, Bellevue, WA (US); Michal Hlavac, Seattle, WA (US); Ryan J. D'Aurelio, Seattle, WA (US); Michael T. Hochkeppel, Seattle, WA (US); Charles Lapp, Redmond, WA (US); Arthur Ramazanov, Redmond, WA (US); Pedro Ramirez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 16/107,990

(22) Filed: Aug. 21, 2018

(65) Prior Publication Data
US 2019/0347866 A1 Nov. 14, 2019

Related U.S. Application Data

(60) Provisional application No. 62/671,370, filed on May 14, 2018.

(51) Int. Cl.
*G06T 19/20* (2011.01)
*G06F 9/445* (2018.01)
(Continued)

(52) U.S. Cl.
CPC .......... *G06T 19/20* (2013.01); *G06F 9/44542* (2013.01); *G06T 19/006* (2013.01); *H04N 13/332* (2018.05); *G06F 40/205* (2020.01)

(58) Field of Classification Search
CPC ....... G06T 19/20; G06T 19/006; G06T 19/00; G06T 15/205; G06F 9/44542;
(Continued)

(56) References Cited

U.S. PATENT DOCUMENTS 6,222,555 B1 4/2001 Christofferson et al.
8,416,242 B1 4/2013 Hutchins
(Continued)

OTHER PUBLICATIONS

"Mesh Simplify—Quickly reduce polygon count on your 3D models", Retrieved from: https://forum.unity.com/threads/mesh-simplify-quickly-reduce-polygon-count-on-your-3d-models.347057/, Aug. 10, 2015, 23 Pages.
(Continued)

*Primary Examiner* — Xilin Guo

(57) ABSTRACT

Optimizing viewing assets, such as three-dimensional (3D) virtual objects for mixed reality (MR), virtual reality (VR), or augmented reality (AR) environment visualization may involve obtaining a viewing asset, generating a decimation request for the obtained viewing asset, responsive to generating the decimation request, receiving a set of decimation files, based at least on the set of decimation files, generating a plurality of selectable options, receiving a user selection of an option, and outputting the selected option as a converted viewing asset. Disclosed examples may also include specifying a maximum file size, a minimum polygon count, a maximum polygon count, and a minimum number of renderable viewing assets on a target display platform. Disclosed examples may operate automatically, and may permit tailoring of a decimation recipe.

20 Claims, 8 Drawing Sheets

(51) Int. Cl.
*H04N 13/332* (2018.01)
*G06T 19/00* (2011.01)
*G06F 40/205* (2020.01)

(58) Field of Classification Search
CPC ............... G06F 17/2705; G06F 3/0482; G06F 3/04847; G06F 40/205; G06F 9/451; G06F 19/20; G06F 11/2094; H04N 13/332; H04N 21/40; G02B 2027/014; H04L 67/02; H04L 41/0896; G06Q 10/00
See application file for complete search history.

(56) References Cited

U.S. PATENT DOCUMENTS

| | | | |
|---|---|---|---|
| 9,704,270 | B1 | 7/2017 | Main et al. |
| 2003/0107572 | A1 | 6/2003 | Smith et al. |
| 2015/0348305 | A1 | 12/2015 | Goossens et al. |
| 2016/0140189 | A1* | 5/2016 | Amitai ................. G06F 3/0482 707/722 |
| 2017/0139945 | A1* | 5/2017 | Gandhi ............... G06F 16/1734 |
| 2017/0358110 | A1 | 12/2017 | Omachi et al. |
| 2018/0350135 | A1* | 12/2018 | Castaneda ............... G06T 15/20 |
| 2019/0088013 | A1* | 3/2019 | Baeli ....................... G06T 17/10 |

OTHER PUBLICATIONS

"Polygon Cruncher: the optimization studio", Retrieved from: http://www.mootools.com/plugins/us/polygoncruncher/, Retrieved Date: Jul. 12, 2018, 9 Pages.

"Polygon Reduction with Meshlab", Retrieved from: https://www.shapeways.com/tutorials/polygon_reduction_with_meshlab, May 15, 2009, 4 Pages.

"Application as Filed in PCT Application No. US2018/038885", Jun. 22, 2018, 23 Pages.

Lee, et al., "An Accelerating 3D Image Reconstruction System Based on the Level-of-Detail Algorithm", In GSTF Journal on Computing, vol. 3, Issue 3, Dec. 2013, 10 Pages.

"International Search Report and Written Opinion Issued in PCT Application No. PCT/US19/031870", dated Jul. 25, 2019, 9 Pages.

\* cited by examiner

OPTIMIZING VIEWING ASSETS

CROSS-REFERENCE TO RELATED APPLICATION

The present application claims priority to U.S. provisional patent application Ser. No. 62/671,370, filed May 14, 2018, entitled "OPTIMIZING VIEWING ASSETS", and hereby incorporated by reference herein in its entirety.

BACKGROUND

Displaying user-generated three-dimensional (3D) content in some applications pose challenges when the assets are not properly optimized for the constraints of mixed reality (MR), virtual reality (VR), and augmented reality (AR) (collectively MR) displays. Some displays may thus impose restrictions on the geometric complexity of the 3D content, or restrict the amount of assets that may be placed in a scene. In traditional 3D and Holographic applications, where the 3D content is generated by application developers, content may be optimized in advance so that the application will run smoothly within any hardware limitations. However, user-generated application content is not available for optimization by application developers, and some users may not be sufficiently familiar with optimization techniques in order to ensure that applications run smoothly and efficiently. Even when a user has the proper technical expertise to optimize models, manually optimizing a large catalog of models can be a time-consuming and costly exercise for the user.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to optimizing viewing assets, such as three-dimensional (3D) virtual objects for mixed reality (MR), virtual reality (VR), or augmented reality (AR) environment visualization may involve obtaining a viewing asset, generating a decimation request for the obtained viewing asset, responsive to generating the decimation request, receiving a set of decimation files, based at least on the set of decimation files, generating a plurality of selectable options, receiving a user selection of an option, and outputting the selected option as a converted viewing asset. Disclosed examples may also include specifying a maximum file size, a minimum polygon count, a maximum polygon count, and a minimum number of renderable viewing assets on a target display platform. Disclosed examples may operate automatically, and may permit tailoring of a decimation recipe.

Some aspects disclosed herein are directed to optimizing viewing assets using a processor; and a computer-readable medium storing instructions that are operative when executed by the processor to: obtain a viewing asset; generate a decimation request for the obtained viewing asset; responsive to generating the decimation request, receive a set of decimation files; based at least on the set of decimation files, generate a plurality of selectable options; receive a user selection of an option; and output the selected option as a converted viewing asset.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
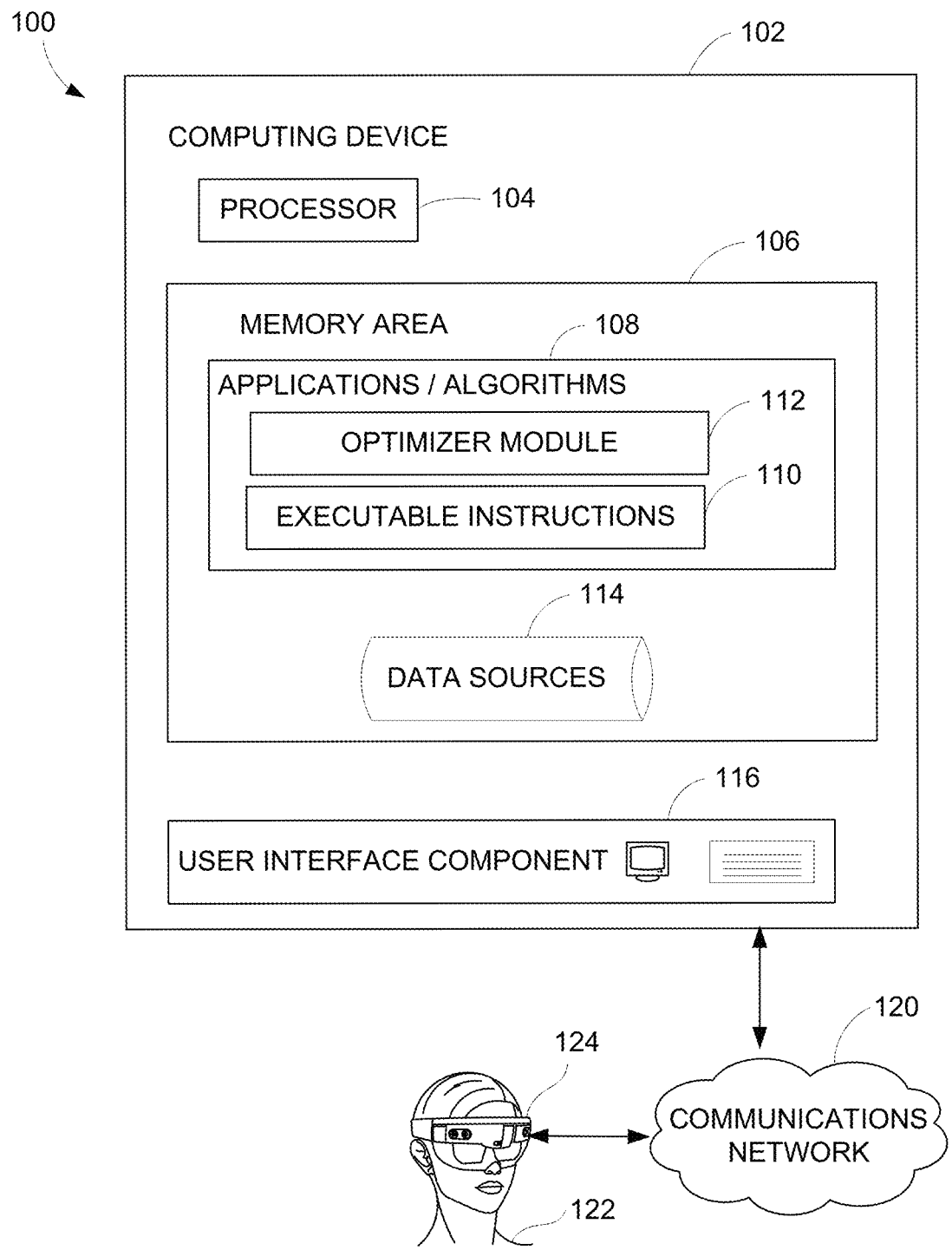
FIG. 1 is a block diagram of an example computing environment that may be implemented as a real-world device or virtual device using some of the various examples disclosed herein.

The various embodiments will be described in detail with reference to the accompanying drawings. The same reference numbers may be used throughout the drawings to refer to the same or like parts. References made throughout this disclosure relating to specific examples and implementations are provided solely for illustrative purposes but, unless indicated to the contrary, are not meant to limit all examples.

Optimizing viewing assets, such as three-dimensional (3D) virtual objects for mixed reality (MR), virtual reality (VR), or augmented reality (AR) environment visualization may involve obtaining a viewing asset, generating a decimation request for the obtained viewing asset, responsive to generating the decimation request, receiving a set of decimation files, based at least on the set of decimation files, generating a plurality of selectable options, receiving a user selection of an option, and outputting the selected option as a converted viewing asset. Disclosed examples may also include specifying a maximum file size, a minimum polygon count, a maximum polygon count, and a minimum number of renderable viewing assets on a target display platform. Disclosed examples may operate automatically, and may permit tailoring of a decimation recipe.

When users bring custom-generated assets (3D models) to an MR, VR or AR (collectively, MR) display platform, such as a head mounted displays (HMD), the assets may require conversion and decimation. This is due to possible processing and storage constraints on wearable devices, such as a HoloLens®. The user might prefer a heavy polygon count (polycount) if high display quality is important, or the user may instead prefer a lower polycount if the speed of rendering is important or a high number of duplicates will be rendered.

Polycount is the number of facets on a virtual. While higher polycount may produce higher display quality in some scenarios, this is not universal, and higher polycounts may negatively impact the potential rendered frames per second. For some HMDs, approximately 100,000 unique polygons and/or 100 unique meshes may be used while maintaining an appropriate rate of rendered frames per second. Thus, for some games, it may be desirable to keep polycount relatively low, while still preserving sufficient display quality for the application. The polygons are typically triangles and have associated and meshes (sets of triangles). Meshes add complexity and impact rendering performance. Meshes are subparts of the viewing asset object; each mesh has its own polycount, and the total polycount for an asset is the sum of all meshes.

Various embodiments disclosed herein refer to 3D models, e.g., full-sized 3D models and decimated 3D models. These may include generated 2D or 3D holograms. Embodiments are not limited to just 3D models, as the same disclosed decimation techniques may be applied to 2D models as well. Thus, full-sized and decimated 2D models are interchangeable with the referenced full-sized and decimated 3D models. Referring to the figures, examples of the disclosure enable efficient 3D model decimation that provides varying options of Level of Detail (LOD) for user selection and configuration. The methods described herein optimize viewing assets, providing user controls for decimation and LOD selection, and interpreting the resulting model into a format that may be consumed by MR applications.

Using 3D objects, or models, in MR programs and/or devices may enhance realism and improve the experience of user interaction. However, if a user wants to bring custom assets (i.e. objects, models, etc.) to the MR space, the custom asset must be decimated and converted into a format compatible with the desired program and/or device. For example, a user may create a 3D model of an object for an MR environment using 3D-modeling software. For example, the 3D model may be created using AutoCAD® developed by AUTODESK®. This 3D model is generally a large computer-aided design (CAD) file with a considerable amount of detail and a large initial number of polygons, faces, textures, colors, levels of detail (LODs), polygon count (polycount), file size, and/or primitive data. A target MR device may require that the 3D model be decimated in order to be used, e.g., decimated to a certain resolution or file size in order before being processed to avoid heating the MR device beyond certain thermic parameters, for example.

In addition, different options of LODs may be desired depending on the asset. For example, to demonstrate que quality and showcase of a model, a heavy polycount asset may be desired. As another example, to bring multiple assets with a desired dimension, a low polycount asset may be desired. As used herein, polycount refers to the number of faces on an object. In some environments, such as gaming, polycount optimization may target a lower polycount, while in other environments a higher polycount may be optimal.

Aspects of this disclosure provide a user with varying selectable options of LODs with decimation in a user interface (UI)—friendly manner that presents selections and customization options to the user as well. An imported asset is decimated and various different polycount options are provided along with a preview of the asset (or model) with the associated LOD and other display information corresponding to each different polycount option. For example, the higher the fidelity of the model, the higher the polycount may be for a given option. User selection may be received for the desired option and the resulting decimated and converted asset may then be output or otherwise used by target computing systems (i.e., MR devices, applications, etc.).

Aspects of the disclosure further provide increased user interaction performance by enabling realism and improving user experience within a mixed reality space or representation of space. By providing custom 3D assets decimated and converted to a targeted LOD, aspects of the disclosure further improve processing speed and resource usage of the corresponding computer systems as well. As described herein, an optimization component provides a representation of varying polycount options via a UI that allows for comparison of 3D assets at various target LODs and polycounts, converting the selected option into a format that the target application (i.e., MR application) understands. In effect, the optimization component enables a configurable or customizable decimation process for user control.

By taking in user-generated 3D content of arbitrary complexity and automatically optimizing the content for export to the target device/application, optimal option results are provided for selection without requiring user knowledge of the optimal requirements. These optimal option results are based on heuristics that consider the limitations of the target hardware and the topological structure of models typically created by users in the application's target audience. The resulting selectable options provide additional data that inform a user as to the impact of a given selection on the target device/application and/or environment.

FIG. 1 is a block diagram of an example computing environment 100 that may be implemented as a real-world device or virtual device using some of the various examples disclosed herein. A computing device 102 represents any device executing instructions (e.g., as application programs, operating system functionality, or both) to implement operations and functionality as described herein. Computing device 102 may include a mobile computing device or any other portable device. In some examples, a mobile computing device includes a mobile telephone, laptop, tablet, computing pad, netbook, gaming device, wearable device, head mounted display (HMD) and/or portable media player. Computing device 102 may also represent less portable devices such as desktop personal computers, kiosks, tabletop devices, industrial control devices, wireless charging stations, electric automobile charging stations, and other physical objects embedded with computing resources and/or network connectivity capabilities. Additionally, computing device 102 may represent a group of processing units or other computing devices.

In some examples, computing device 102 has at least one processor 104, a memory area 106, and at least one user interface. These may be the same or similar to processor(s) 714 and memory 712 of FIG. 7, respectively. Processor 104 includes any quantity of processing units and is programmed to execute computer-executable instructions for implementing aspects of the disclosure. The instructions may be performed by the processor or by multiple processors within the computing device, or performed by a processor external to the computing device. In some examples, processor 104 is programmed to execute instructions such as those that may be illustrated in the other figures.

Computing device 102 further has one or more computer readable media such as the memory area 106. Memory area 106 includes any quantity of media associated with or accessible by the computing device. Memory area 106 may be internal to computing device 102 (as shown in FIG. 1), external to the computing device (not shown), or both (not shown). In some examples, memory area 106 includes read-only memory and/or memory wired into an analog computing device. Memory area 106 stores, among other data, one or more applications or algorithms 108 that include data and executable instructions 110. The applications, when executed by processor 104, operate to perform functionality on the computing device. Exemplary applications include optimizer applications and/or components applications, such as optimizer module 112, for example. The applications may communicate with counterpart applications or services such as web services accessible via a network, such as communications network 120. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. Memory area 106 may store data sources 114, which may represent data stored locally at memory area 106, data access points stored locally at memory area 106 and associated with data stored remote from computing device 102, or any combination of local and remote data.

The user interface component 116, may include instructions executed by processor 104 of computing device 102, and cause processor 104 to perform operations, including to receive user input, provide output to a user and/or user device, and interpret user interactions with a computing device. Portions of user interface component 116 may thus reside within memory area 106. In some examples, user interface component 116 includes a graphics card for displaying data to a user 122 and receiving data from user 122. User interface component 116 may also include computer-executable instructions (e.g., a driver) for operating the graphics card. Further, user interface component 116 may include a display (e.g., a touch screen display or natural user interface) and/or computer-executable instructions (e.g., a driver) for operating the display. In some examples, the display may be a 3D display, such as may be found in an HMD. User interface component 116 may also include one or more of the following to provide data to the user or receive data from the user: a keyboard (physical or touch-screen display), speakers, a sound card, a camera, a microphone, a vibration motor, one or more accelerometers, a Bluetooth® brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface. In still other examples, a user, such as user 122, may interact with a separate user device 124, which may control or be controlled by computing device 102 over communications network 120, a wireless connection, or a wired connection. In some examples, user device 124 may be similar to functionally equivalent to computing device 102.

As illustrated, in some examples, computing device 102 further includes a camera 130, which may represent a single camera, a stereo camera set, a set of differently-facing cameras, or another configuration. Computing device 102 may also further include an inertial measurement unit (IMU) 132 that may incorporate one or more of an accelerometer, a gyroscope, and/or a magnetometer. The accelerometer, gyroscope, and/or a magnetometer may each output measurements in 3D. The combination of 3D position and 3D rotation may be referred to as six degrees-of-freedom (6DoF), and a combination of 3D accelerometer and 3D gyroscope data may permit 6DoF measurements. In general, linear accelerometer data may be the most accurate of the data from a typical IMU, whereas magnetometer data may be the least accurate.

Also illustrated, in some examples, computing device 102 additionally may include a generic sensor 134 and a radio system 136. Generic sensor 134 may include an infrared (IR) sensor (non-visible light sensor), a visible light sensor (such as an ambient light sensor or a spectrally-differentiated set of ambient light sensors), a light detection and ranging (LIDAR) sensor (range sensor), an RGB-D sensor (light and range sensor), an ultrasonic sensor, or any other sensor, including sensors associated with position-finding and range-finding. Radio system 136 may include Bluetooth®, Wi-Fi, cellular, or any other radio or wireless system. Radio system 136 may act as a sensor by detecting signal strength, direction-of-arrival and location-related identification data in received signals, such as GPS signals. Together, one or more of camera 130, IMU 132, generic sensor 134, and radio system 136 may collect data (either real-time, telemetry, or historical data) for use in behavior analysis of user position, movement, and gaze in mixed reality space.

Figure 2:
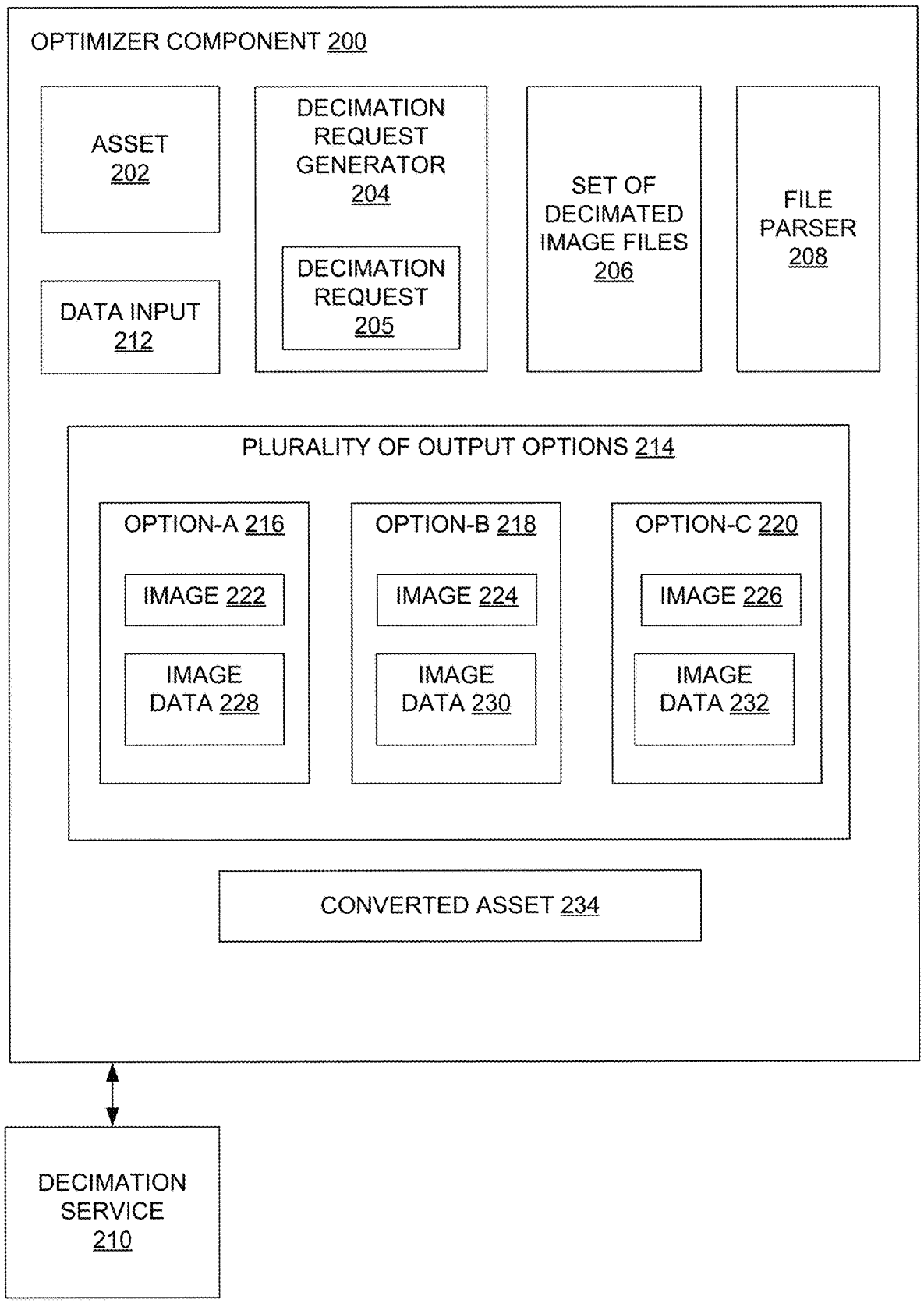
FIG. 2 is a block diagram of an optimizer component suitable for implementing some of the various examples disclosed herein.

FIG. 2 is a block diagram of an optimizer component 200 that is suitable for implementing some of the various examples disclosed herein. Optimizer component 200 may be implemented as a cloud service, in part or in whole, and may further be implemented on one or more computer storage devices having computer-executable instructions stored thereon for optimizing 3D viewing assets. That is, optimizer component 200 may leverage computing environments described in relation to other figures described herein. It should be understood that functionality may be allocated among the different portions in some embodiments differently than is described in this exemplary embodiment.

Optimizer component 200 obtains or receives a viewing asset, such as asset 202, as input. Asset 202 may include, without limitation, a 3D model, 3D object, graphical layout, or any other suitable 3D asset, for example. Decimation request generator 204 generates decimation request 205 for decimation of asset 202. The decimation request may include the number of desired options and the desired LOD range for the options to be returned as decimated image files. In some examples, decimation request generator 204 determines a number of options and the desired LOD range for the options based on pre-configured parameters (i.e. default configuration for four options within a threshold range). In other examples, decimation request generator 204 determines a number of options and the desired LOD range based in part on data input 212. Data input 212 may be user input or may be input derived from machine learning and/or telemetry data in some examples. Decimation request 205 is transmitted to decimation service 210 by optimizer component 200 and set of decimated image files 206 is received in response to decimation request 205.

Set of decimated image files 206 may be one or more image files for asset 202 converted by decimation service 210 into a target format expected for a target application or environment, such as a VR/MR program for example. The set of decimated image files may include an individual image file for each individual option requested. In other words, if the decimation request is for four options, the set of decimated image files returned will include four individual files. File parser 208 parses set of decimated image files 206 to extract the data points and image previews for each option to display as selectable and/or configurable options. Extracted data points may include, without limitation, triangles, meshes, file properties, and other data. File parser 208 analyzes the extracted data points to identify information for each option, such as the polycount, meshes, vertices, file size, and so on, and uses that identified information alongside the image preview of the asset to generate plurality of output options 214. As used herein, meshes refer to subparts of the object, or asset, where each mesh has its own polycount, and the total polycount for the object is the sum of all meshes. A mesh is a set of triangles, and polycount refers to the number of triangles.

Plurality of output options 214 includes option-A 216, option-B 218, and option-C 220. Each option has a corresponding image preview (image 222, image 224, and image 226) and corresponding image data (image data 228, image data 230, image data 232) for that option. Image data may include, without limitation, image properties, file properties, polycount or triangle count, mesh count, materials count, file size, LOD value, and any other suitable information. Plurality of output options 214 provide a selectable and/or interactive representation of decimated options for display via a user interface. Plurality of output options 214 as depicted here includes three options for illustrative purposes of describing aspects of the disclosure, however it should be understood that more or fewer options may be output.

In some examples, the decimated image files may be received from the decimation service as GLB files. The optimizer component may open the GLB files using a GLB file parser (i.e. file parser 208 for example) to parse for properties, parsing into a structure where each data point can be calculated to obtain values to output as image data, for example. The file parser may further interpret and/or analyze the file properties to generate an indication of how a selection of the corresponding option may affect the end product or target scene. For example, analysis results from file parser 208 may provide information indicating a number of models that may be rendered for an environment (i.e. selection of option-A would allow for three assets to be rendered in the room, whereas selection of option-B would allow for 200 assets to be rendered in the same room). Other analysis results could provide an indication of the frames per second for a given option, for example.

A single GLB file may have the high-level LOD image (LOD-0) and the low-level LOD image for a given option, such that in the example of four options, with four GLB files returned as the set of decimated files, each of the four returned files will include the LOD-0 for that option, and the optimizer component will display each of the four LOD-0 images as the image preview for the corresponding option. (See also FIG. 4.) In this way, aspects of the disclosure provide a user-friendly interface to the decimation service. A user may simply import a model they want to use in the target 3D environment, and optimizer component 200 will determine and instruct the decimation service on the parameters for the target environment and the options to be returned, interpreting the results received from the decimation service to provide the various desired options for user selection/interaction with data points for each option provided as well. In addition, based on user selection and/or interaction with optimizer component 200, machine learning components of optimizer component 200 may improve the decimation request options, or "recipe" determinations as well.

Figure 3:
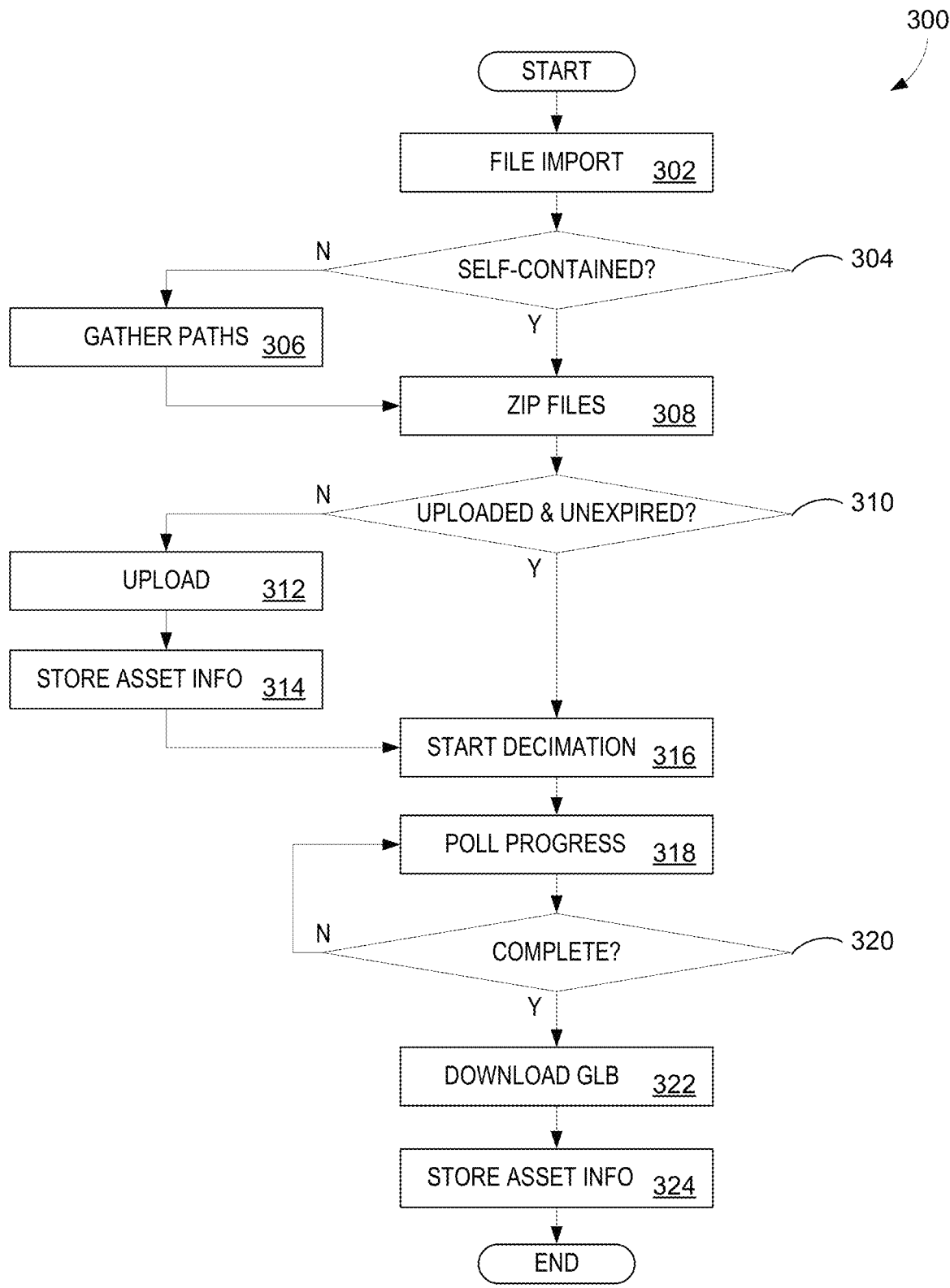
FIG. 3 is a flowchart of an optimization process for implementing some of the various examples disclosed herein.

FIG. 3 is a flowchart 300 of an optimization process for implementing some of the various examples disclosed herein and should be viewed along with FIG. 2. As depicted in this exemplary diagram, a file import may occur in operation 302, and optimizer component 200 may determine whether the file is self-contained (i.e., have all the necessary components) in decision operation 304. If the imported file is determined not to be self-contained, the process gathers paths of unembedded files in operation 306, and converts the files to a zip file in operation 308. If, however, the imported file is determined to be self-contained, the process moves directly to operation 308.

Decision operation 310 determines whether the zip file has been uploaded already and a time limit has not expired. If the file has not previously been uploaded, or the file has been previously uploaded, but the time limit has expired, the process uploads the file to the decimation service in operation 312 and stores the asset ID, asset endpoint, and asset expiration date in operation 314. When the file has been uploaded and the time limit has not expired, a decimation process begins in operation 316. During operation 318, the process may poll the decimation service for progress throughout the decimation process. When a determination is made that the decimation process is complete, in decision operation 320, the process then downloads the zipped GLB file(s) in operation 322 and extracts the zipped file to parse, analyze, interpret, and generate selectable options. See FIGS. 5 and 6 for examples of further details. The decimated asset and relevant information is then stored in operation 324.

Figure 4:
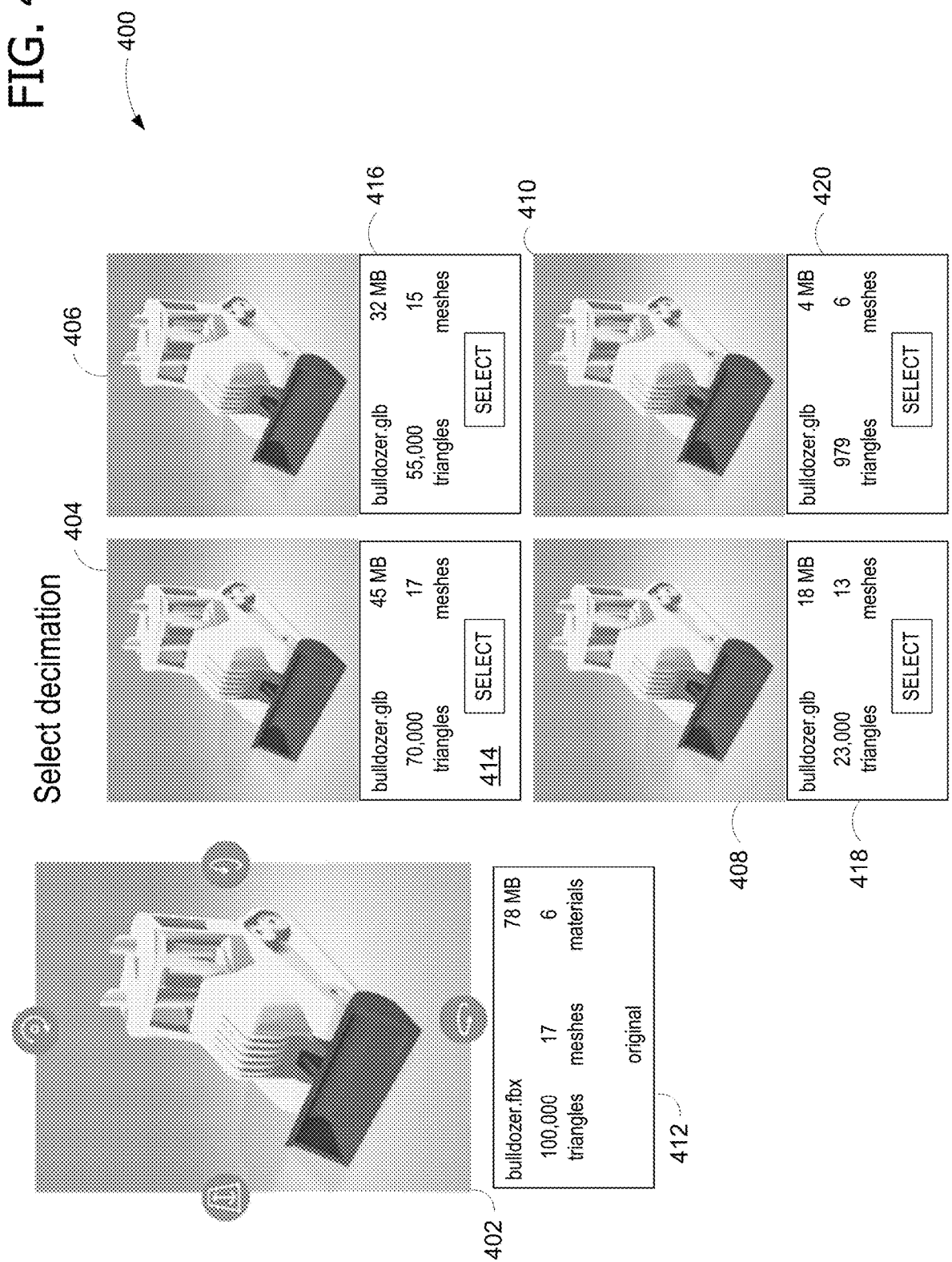
FIG. 4 is an illustrative user interface diagram displaying exemplary output options of the various examples disclosed herein.

FIG. 4 is an illustrative user interface diagram 400 displaying exemplary output options of the various examples disclosed herein. Some exemplary operations present the user with multiple LOD options for decimation. In the exemplary operation depicted in FIG. 4, four (4) options are displayed, although it should be understood that a greater or lesser number of options may be displayed. The original imported asset is be depicted in image 402, with model information displayed below in box 412. Options derived from the set of decimated files, including image previous and image data for each option, are displayed to the right of the original input file in images 404, 406, 408 and 410, each with information displayed about them in boxes 414, 416, 418, and 420, respectively. In this way, a user may understand the various data points of each option, and the impact a selection of a given option may have on a target environment. Other information (not depicted) may also be displayed to provide an understanding of the impact on the target environment that a selection of a given option may achieve. As illustrated, boxes 414, 416, 418, and 420 each display the size of the resulting digital file, the number of polygons (identified as triangles), and the number of meshes, and also provide a user selection control, through which a user selection may be received. Optionally, boxes 414, 416, 418, and 420 may be adapted to further provide information regarding materials, such as the number of different materials.

Figure 5:
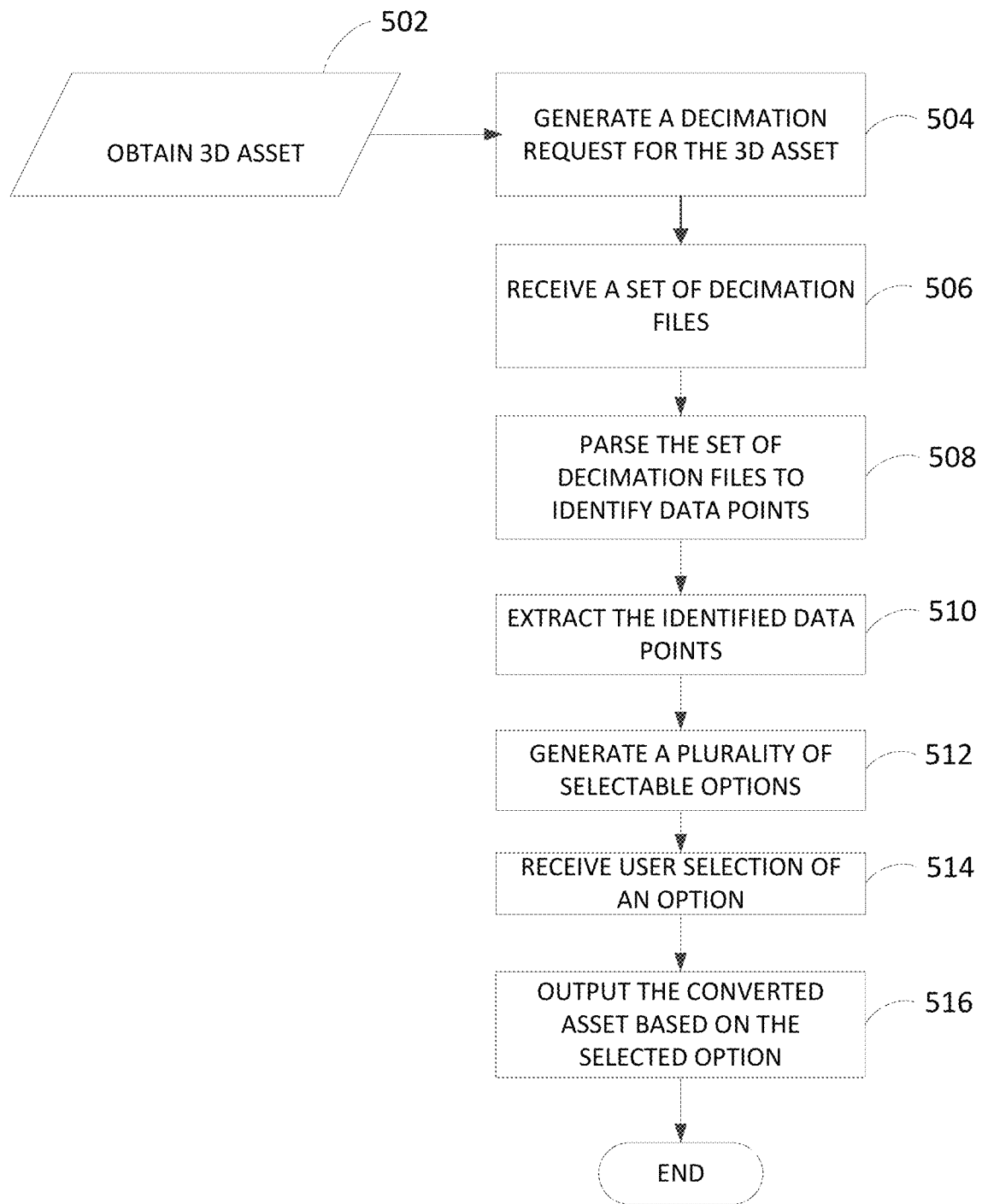
FIG. 5 is another flowchart diagram of an optimization process for implementing some of the various examples disclosed herein.

FIG. 5 is a flowchart diagram 500 of an optimization process for implementing some of the various examples disclosed herein. The process beings with operation 502, in which a viewing asset, such as a model of a 3D virtual object, is obtained or received by an optimizer component, such as optimizer component 200 in FIG. 2, for example. The process generates a decimation request for the viewing asset at operation 504. The decimation request may be generated by a request generator, such as decimation request generator 204 of optimizer component 200 in FIG. 2, for example. The generated decimation request may be passed to a decimation service for decimation and conversion of the asset into a number of requested options.

The process receives a set of decimation files at operation 506. The set of decimation files are received from the decimation service and may include an individual file for each requested option. The process parses the set of decimation files to identify data points at operation 508, such as polycount, meshes, materials, file properties, and the like. The process extracts the identified data points at operation 510 and uses the extracted data points to generate a plurality of selectable options at operation 512. The process receives user selection of an option at operation 514. The process outputs the converted asset based on the selected option at operation 516, with the process terminating thereafter. Thus, flowchart diagram 500 illustrates an optimization process that includes obtaining a viewing asset; generating a decimation request for the obtained viewing asset; responsive to generating the decimation request, receiving a set of decimation files; based at least on the set of decimation files, generating a plurality of selectable options; receiving a user selection of an option; and outputting the selected option as a converted viewing asset.

Figure 6:
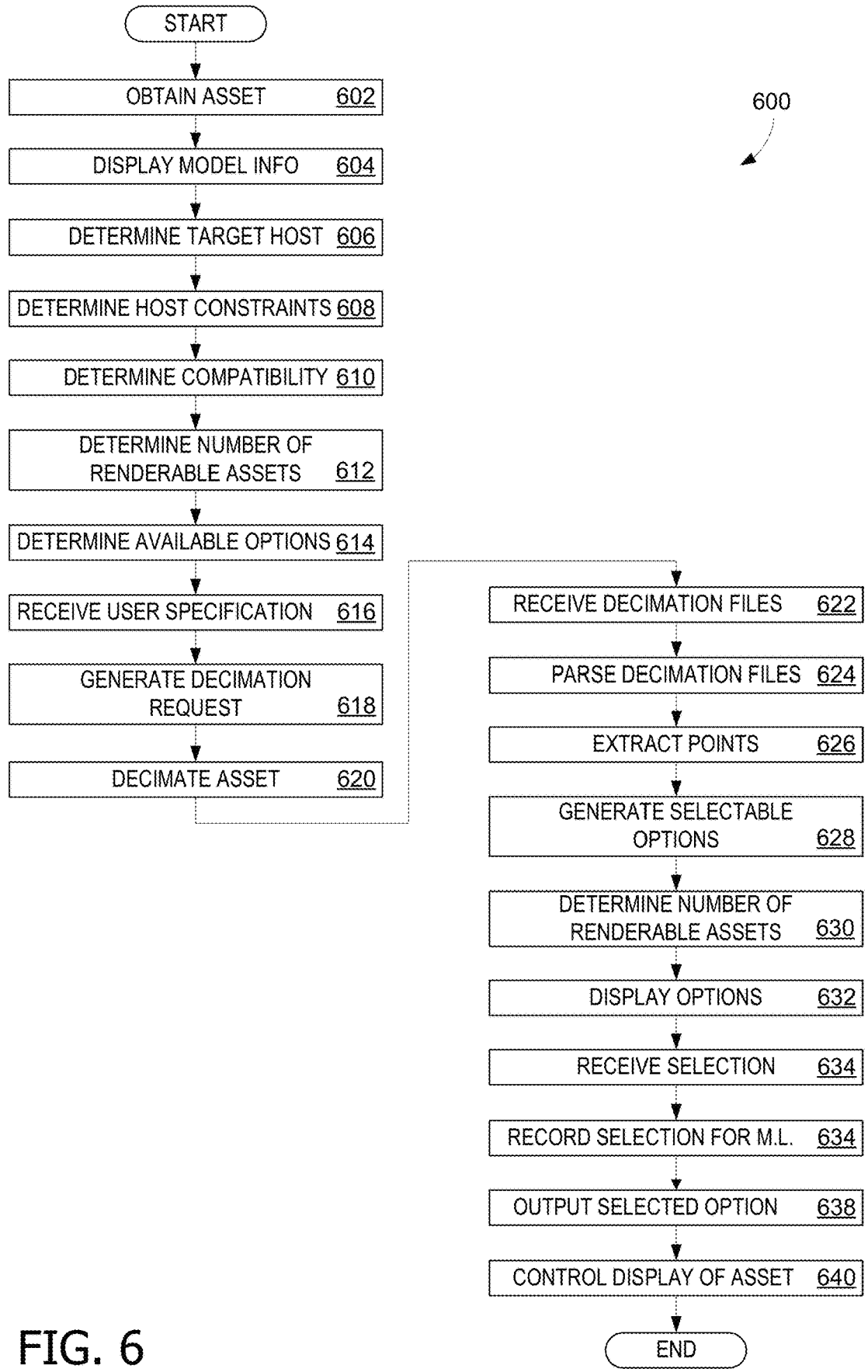
FIG. 6 is another flowchart diagram of an optimization process for implementing some of the various examples disclosed herein.

FIG. 6 is a flowchart 600 of an optimization process for implementing some of the various examples disclosed herein. The process beings when an optimizer application (app) is started, perhaps by opening a viewing asset file. The app may be an optimizer component, such as optimizer component 200 in FIG. 2, for example. Operation 602 includes obtaining a viewing asset. In some examples, the viewing asset may be a 3D virtual object model that is imported. Operation 604 includes displaying model information, for example in box 412 (of FIG. 4). Any of the file name, file size, polygon count, polygon type (triangle or other), number of meshes, and number of different materials may be displayed.

In some examples, operation 606 involves determining the target host, such as the intended display platform, although in other examples, the target host may be predetermined. In some examples, host constraints, such as memory limitations, and other processing constraints that may be relevant to determining an optimal viewing asset complexity for rendering on the host, are determined in operation 608. That is, operation 608 includes determining a constraint of a target host for rendering the viewing asset. In some examples, operation 610 includes determining whether the obtained viewing asset is compatible with the target host, such as whether the imported model is an unsupported file format or is excessively large. In some examples, based at least on the determined constraint(s) of the target host, operation 612 determines a number of original (i.e., as obtained) viewing assets that can be rendered on the target host.

Operation 614 determine the classes of options that may be available to offer user. These may include decimation of the imported asset based on LOD, file size, polygon reduction, and/or file format conversion. The options may be driven by the capabilities of the decimation tool or service (such as optimizer module 112 of FIG. 1, decimation service 210 of FIG. 2, or optimizer service 812 of FIG. 8). In an exemplary embodiment, an inquiry may be made of a Simplygon® service regarding a range LODs that may fit into HoloLens®, or another target 3D platform. Operation 616 includes receiving a user specification that may be used in operation 618 for generating a decimation request. An example user specification may include any of a maximum file size, a minimum polygon count, a maximum polygon count, and a minimum number of renderable viewing assets (based on the target host constraint or constraints, such as memory and/or processing limitations). Some examples may enable a user to select decimation option ranges with graphical user interface (GUI) controls such as sliders and knobs for selectively manipulating polycounts, meshes, and file sizes.

Operation 618 then includes generating a decimation request for the obtained viewing asset. In some examples, generating a decimation request for the obtained viewing asset comprises, based at least on the user specification of the decimation request (received in operation 616), generating the decimation request for the obtained viewing asset. A decimation request may include multiple different polycounts. Decimation is performed in operation 620. Decimation may be based on heuristics that consider the limitations of the target hardware and the topological structure of models typically created by users in the application's target audience. The decimation service may be local or remote, such as a cloud service, and may output a simplified GLB file. A single GLB file may contain both the high LOD image (LOD-0 (zero)) and the low LOD level image or data. In the example depicted in FIG. 4, the decimation service had returned four (4) GLB files, with each GLB file having the LOD-0 for that option, and it is the LOD-0 that is displayed in each of images 404, 406, 408, and 410.

Operation 622 includes, responsive to generating the decimation request, receive a set of decimation files. In some examples the files may be received directly. In some examples, a URL may be received, and the files may then be retrieved from that URL. The received decimation files (GLB) may then be opened for parsing, starting in operation 624 to extract the data points, in operation 626, and generate image previews for each option to display as selectable and/or configurable options in operation 628. Extracted data points may include, without limitation, triangles, meshes, file properties, and other data. A file parser, for example file parser 208 (of FIG. 2) may analyze the extracted data points to identify information for each option, such as the polycount, meshes, vertices, file size, and so on, and uses that identified information alongside the image preview of the asset to generate plurality of output options. Thus, operation 628 includes, based at least on the set of decimation files, generating a plurality of selectable options.

In some example, operation 630 includes, based at least on the constraint of the target host, for each of the plurality of selectable options, determining a number of viewing assets that can be rendered on the target host. For example, a first option may have a size such that only 10 of the assets may be rendered on the target host, whereas for another option having a smaller size, 100 of the assets may be rendered on the target host. This number may be presented to the user, to further inform the user's selection of an option.

The options are displayed to the user in operation 632, perhaps using an output similar to exemplary user interface diagram 400 of FIG. 4. Operation 634 includes receiving a user selection of an option, perhaps, for example with the GUI controls depicted in FIG. 4. In some examples, the received user selection may be recorded for a machine learning (ML) application that may suggest options or specifications (i.e., optimization "recipes") for future users. Operation 638 then includes outputting the selected option as a converted viewing asset. That may include saving the selected option as a file locally, remotely, and/or transmitting or sending the converted asset to the target host. Some environments or display platforms may need only a silhouette, whereas others may also need internal features of the asset. The optimized asset is displayed in operation 640, for example on any of AR, VR, and MR hardware. That is, the viewing asset may be displayed within a purely VR environment, or may be projected onto a surface in an MR environment.

ADDITIONAL EXAMPLES

Some aspects and examples disclosed herein are directed to a solution for optimizing viewing assets that may comprise: a processor; and a computer-readable medium storing instructions that are operative when executed by the processor to: obtain a viewing asset; generate a decimation request for the obtained viewing asset; responsive to generating the decimation request, receive a set of decimation files; based at least on the set of decimation files, generate a plurality of selectable options; receive a user selection of an option; and output the selected option as a converted viewing asset.

Additional aspects and examples disclosed herein are directed to a process for optimizing viewing assets that may comprise: obtaining a viewing asset; generating a decimation request for the obtained viewing asset; responsive to generating the decimation request, receiving a set of decimation files; based at least on the set of decimation files, generating a plurality of selectable options; receiving a user selection of an option; and outputting the selected option as a converted viewing asset.

Additional aspects and examples disclosed herein are directed to one or more computer storage devices having computer-executable instructions stored thereon for optimizing viewing assets, which, on execution by a computer, may cause the computer to perform operations comprising: obtaining a viewing asset comprising a 3D virtual object; generating a decimation request for the obtained viewing asset; responsive to generating the decimation request, receiving a set of decimation files; based at least on the set of decimation files, generating a plurality of selectable options; receiving a user selection of an option; and outputting the selected option as a converted viewing asset.

Alternatively, or in addition to the other examples described herein, other examples may include, but are not limited to, any combination of the following:
  determining a target host;
  determining a constraint of a target host for rendering the viewing asset;
  based at least on the constraint of the target host, determining whether the obtained viewing asset is compatible with the target host;
  based at least on the constraint of the target host, for each of the plurality of selectable options, determining a number of viewing assets that can be rendered on the target host;
  for each of the plurality of selectable options, presenting the number of renderable viewing assets with the selectable options;
  receiving a user specification of a decimation request;
  generating a decimation request for the obtained viewing asset comprises, based at least on the user specification of the decimation request, generating the decimation request for the obtained viewing asset; and
  the user specification comprises at least one constraint selected from the list consisting of: a maximum file size, a minimum polygon count, a maximum polygon count, and a minimum number of renderable viewing assets.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
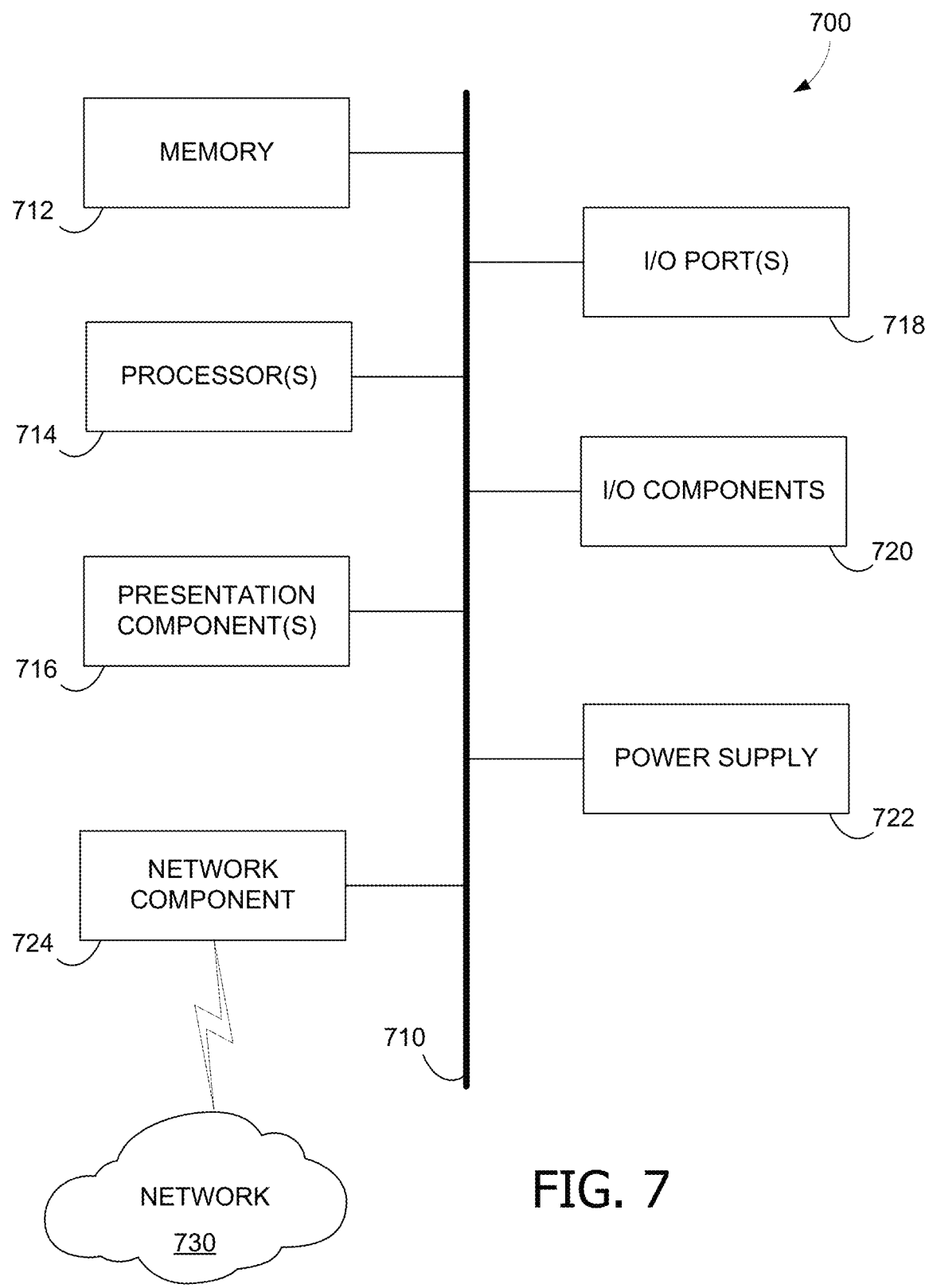
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 8 described in more detail below, where tasks are performed by remote-processing devices that are linked through a communications network.

Computing device 700 includes a bus 710 that directly or indirectly couples the following devices: computer-storage memory 712, one or more processors 714, one or more presentation components 716, input/output (I/O) ports 718, I/O components 720, a power supply 722, and a network component 724. Computer device 700 should not be interpreted as having any dependency or requirement related to any single component or combination of components illustrated therein. While computer device 700 is depicted as a seemingly single device, multiple computing devices 700 may work together and share the depicted device resources. For instance, computer-storage memory 712 may be distributed across multiple devices, processor(s) 714 may provide housed on different devices, and so on.

Bus 110 represents a system bus that may be any of several types of bus structures, including a memory bus or memory controller, a peripheral bus, and a local bus using any of a variety of bus architectures. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and the references herein to a "computing device."

Computer-storage memory 712 may take the form of the computer-storage media references below and operatively provide storage of computer-readable instructions, data structures, program modules and other data for the computing device 700. For example, computer-storage memory 712 may store an operating system, a universal application platform, or other program modules and program data. Computer-storage memory 712 may be used to store and access instructions configured to carry out the various operations disclosed herein.

As mentioned below, computer-storage memory 712 may include computer-storage media in the form of volatile and/or nonvolatile memory, removable or non-removable memory, data disks in virtual environments, or a combination thereof. And computer-storage memory 712 may include any quantity of memory associated with or accessible by the display device 700. The memory 712 may be internal to the display device 700 (as shown in FIG. 7), external to the display device 700 (not shown), or both (not shown). Examples of memory 712 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 700. Additionally or alternatively, the computer-storage memory 712 may be distributed across multiple display devices 700, e.g., in a virtualized environment in which instruction processing is carried out on multiple devices 700. For the purposes of this disclosure, "computer storage media," "computer-storage memory," "memory," and "memory devices" are synonymous terms for the computer-storage media 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flowcharts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. Ports 718 allow computing device 700 to be logically coupled to other devices including I/O components 720, some of which may be built in. Examples I/O components 720 include, for example but without limitation, a microphone, joystick, game pad, satellite dish, scanner, printer, wireless device, etc.

The computing device 700 may operate in a networked environment via the network component 724 using logical connections to one or more remote computers over a network 730. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, the network component 724 is operable to communicate data over public, private, or hybrid (public and private) using a transfer protocol, between devices wirelessly using short range communication technologies (e.g., near-field communication (NFC), Bluetooth® branded communications, or the like), or a combination thereof. By way of example, network 730 may include, without limitation, one or more communication networks, such as local area networks (LANs) and/or wide area networks (WANs).

Figure 8:
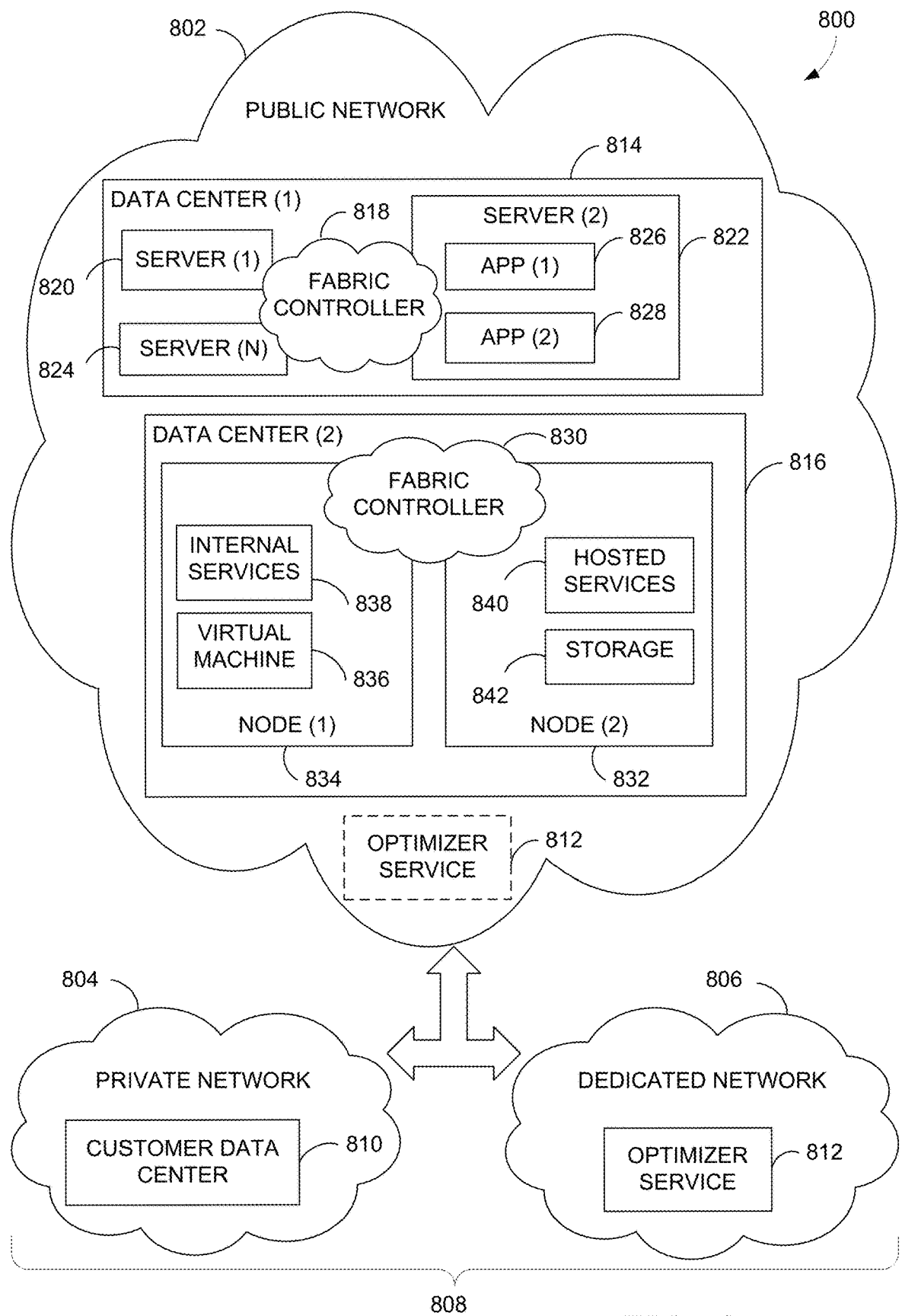
FIG. 8 is a block diagram of an example cloud-computing infrastructure suitable for a behavior analysis service implementing some of the various examples disclosed herein.

Turning now to FIG. 8, an exemplary block diagram illustrates a cloud-computing architecture 800, suitable for use in implementing aspects of this disclosure. Architecture 800 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 8 includes a public network 802, a private network 804, and a dedicated network 806. Public network 802 may be a public cloud-based network of computing resources, for example. Private network 804 may be a private enterprise network or private cloud-based network of computing resources. And dedicated network 806 may be a third-party network or dedicated cloud-based network of computing resources. In some examples, private network 804 may host a customer data center 810, and dedicated network 806 may host cloud optimizer service 812. (See FIG. 2.)

Hybrid cloud 808 may include any combination of public network 802, private network 804, and dedicated network 806. For example, dedicated network 806 may be optional, with hybrid cloud 808 comprised of public network 802 and private network 804. Along these lines, some customers may opt to only host a portion of their customer data center 810 in the public network 802 and/or dedicated network 806, retaining some of the customers' data or hosting of customer services in the private network 804. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 808 in which some data storage and processing is performed in the public network 802 while other data storage and processing is performed in the dedicated network 806.

Public network 802 may include data centers configured to host and support operations, including tasks of a distributed application, according to the fabric controller 818. It will be understood and appreciated that data center 814 and data center 816 shown in FIG. 8 are merely examples of suitable implementations for accommodating one or more distributed applications, and are not intended to suggest any limitation as to the scope of use or functionality of examples disclosed herein. Neither should data center 814 and data center 816 be interpreted as having any dependency or requirement related to any single resource, combination of resources, combination of servers (e.g., servers 820 and 824) combination of nodes (e.g., nodes 832 and 834), or a set of application programming interfaces (APIs) to access the resources, servers, and/or nodes.

Data center 814 illustrates a data center comprising a plurality of servers, such as servers 820 and 824. A fabric controller 818 is responsible for automatically managing the servers 820 and 824 and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. One or more role instances of a distributed application may be placed on one or more of the servers 820 and 824 of data center 814, where the one or more role instances may represent the portions of software, component programs, or instances of roles that participate in the distributed application. In other examples, one or more of the role instances may represent stored data that are accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As described above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, a server, the computing device 700 of FIG. 7, and the like. In one instance, the nodes 832 and 834 host and support the operations of the virtual machine(s) 836, while simultaneously hosting other virtual machines carved out for supporting other tenants of the data center 816, such as internal services 838, hosted services 840, and storage 842. Often, the role instances may include endpoints of distinct service applications owned by different customers.

Typically, each of the nodes include, or is linked to, some form of a computing unit (e.g., central processing unit, microprocessor, etc.) to support operations of the component (s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 802. The network cloud serves to interconnect resources, such as the role instances, which may be distributed across various physical hosts, such as nodes 832 and 834. In addition, the network cloud facilitates communication over channels connecting the role instances of the service applications running in the data center 816. By way of example, the network cloud may include, without limitation, one or more communication networks, such as LANs and/or WANs. Such communication networks are commonplace in offices, enterprise-wide computer networks, intranets, and the internet, and therefore need not be discussed at length herein.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing solutions as disclosed herein. The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for optimizing viewing assets, the system comprising:
   a processor; and
   a computer-readable medium storing instructions that are operative when executed by the processor to:
      obtain a viewing asset;
      generate a decimation request for the obtained viewing asset;
      responsive to generating the decimation request, receive a set of decimation files;
      based at least on the set of decimation files, generate a plurality of image previews that demonstrate selectable decimated options of the viewing asset, wherein an individual decimated option of the viewing asset demonstrates a lower polycount as compared to the viewing asset, and the selectable decimated options demonstrate polycounts that vary from each other;
      display the plurality of image previews that demonstrate various selectable decimated options of the viewing asset;
      receive a user selection that selects one of the selectable decimated options; and
      output the selected decimated option as a converted viewing asset.

2. The system of claim 1 wherein the instructions are further operative to:
   determine a target host.

3. The system of claim 1 wherein the instructions are further operative to:
   determine a constraint of a target host for rendering the viewing asset.

4. The system of claim 3 wherein the instructions are further operative to:
   based at least on the constraint of the target host, determine whether the obtained viewing asset is compatible with the target host.

5. The system of claim 3 wherein the instructions are further operative to:
   based at least on the constraint of the target host, for each of the selectable decimated options, determine a number of viewing assets that can be rendered on the target host; and
   for each of the selectable decimated options, present the number of renderable viewing assets with the selectable options.

6. The system of claim 1 wherein the instructions are further operative to:
   receive a user specification of a decimation request,
   wherein generating a decimation request for the obtained viewing asset comprises, based at least on the user specification of the decimation request, generating the decimation request for the obtained viewing asset.

7. The system of claim 6 wherein the user specification comprises at least one constraint selected from a list consisting of:
a maximum file size, a minimum polygon count, a maximum polygon count, and a minimum number of renderable viewing assets.

8. The system of claim 1, wherein another decimated option of the viewing asset demonstrates a less number of meshes as compared to the viewing asset, and the selectable decimated options demonstrate meshes that vary in number from each other.

9. The system of claim 1, wherein another decimated option of the viewing asset consumes less memory as compared to the viewing asset, and the selectable decimated options consume an amount of memory that vary from each other.

10. A method of optimizing viewing assets, the method comprising:
obtaining a viewing asset;
generating a decimation request for the obtained viewing asset;
responsive to generating the decimation request, receiving a set of decimation files;
based at least on the set of decimation files, generating a plurality of image previews that demonstrate selectable decimated options of the viewing asset, wherein an individual decimated option of the viewing asset demonstrates a lower polycount as compared to the viewing asset, and the selectable decimated options demonstrate polycounts that vary from each other;
displaying the plurality of image previews that demonstrate various selectable decimated options of the viewing asset;
receiving a user selection that selects one of the selectable decimated options; and
outputting the selected decimated option as a converted viewing asset.

11. The method of claim 10 wherein a viewing asset comprises a three-dimensional (3D) virtual object.

12. The method of claim 10 further comprising:
determining a constraint of a target host for rendering the viewing asset.

13. The method of claim 12 further comprising:
based at least on the constraint of the target host, determining whether the obtained viewing asset is compatible with the target host.

14. The method of claim 12 further comprising:
based at least on the constraint of the target host, for each of the selectable decimated options, determining a number of viewing assets that can be rendered on the target host; and
for each of the selectable decimated options, presenting the number of renderable viewing assets with the selectable options.

15. The method of claim 10 further comprising:
receiving a user specification of a decimation request,
wherein generating a decimation request for the obtained viewing asset comprises, based at least on the user specification of the decimation request, generating the decimation request for the obtained viewing asset.

16. The method of claim 15 wherein the user specification comprises at least one constraint selected from a list consisting of:
a maximum file size, a minimum polygon count, a maximum polygon count, and a minimum number of renderable viewing assets.

17. One or more computer storage devices having computer-executable instructions stored thereon for optimizing viewing assets, which, on execution by a computer, cause the computer to perform operations comprising:
obtaining a viewing asset comprising a three-dimensional (3D) virtual object;
generating a decimation request for the obtained viewing asset;
responsive to generating the decimation request, receiving a set of decimation files;
based at least on the set of decimation files, generating a plurality of image previews that demonstrate selectable decimated options of the viewing asset, wherein an individual decimated option of the viewing asset demonstrates a lower polycount as compared to the viewing asset, and the selectable decimated options demonstrate polycounts that vary from each other;
displaying the plurality of image previews that demonstrate various selectable decimated options of the viewing asset;
receiving a user selection that selects one of the selectable decimated options; and
outputting the selected decimated option as a converted viewing asset.

18. The one or more computer storage devices of claim 17 wherein the operations further comprise:
determining a constraint of a target host for rendering the viewing asset.

19. The one or more computer storage devices of claim 17 wherein the operations further comprise:
based at least on a constraint of a target host, for each of the selectable decimated options, determining a number of viewing assets that can be rendered on the target host; and
for each of the selectable decimated options, presenting the number of renderable viewing assets with the selectable options.

20. The one or more computer storage devices of claim 17 wherein the operations further comprise:
receiving a user specification of a decimation request,
wherein generating a decimation request for the obtained viewing asset comprises, based at least on the user specification of the decimation request, generating the decimation request for the obtained viewing asset, and
wherein the user specification comprises at least one constraint selected from a list consisting of:
a maximum file size, a minimum polygon count, a maximum polygon count, and a minimum number of renderable viewing assets.

* * * * *